US007356759B2

(12) United States Patent
Ferguson et al.

(10) Patent No.: US 7,356,759 B2
(45) Date of Patent: Apr. 8, 2008

(54) METHOD FOR AUTOMATICALLY CATALOGING WEB ELEMENT DATA

(75) Inventors: Mary Wier Ferguson, Austin, TX (US); David Kingsley Clark, Cedar Park, TX (US); Julie Louise Gilbreath, Liberty Hill, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/011,240

(22) Filed: Dec. 14, 2004

(65) Prior Publication Data

US 2006/0129911 A1   Jun. 15, 2006

(51) Int. Cl.
*G06F 17/00* (2006.01)
*G06F 17/21* (2006.01)
*G06F 17/27* (2006.01)
*G06F 17/30* (2006.01)

(52) U.S. Cl. .................. 715/204; 715/207; 715/210; 715/234; 715/255; 715/256; 715/275; 707/3; 707/6

(58) Field of Classification Search ............ 715/500, 715/517, 528, 529, 530, 531, 204, 207, 210, 715/234, 255–256, 275; 707/3, 6
See application file for complete search history.

(56) References Cited

U.S. PATENT DOCUMENTS

| | | | | |
|---|---|---|---|---|
| 5,982,370 A | * | 11/1999 | Kamper | 715/760 |
| 6,578,048 B1 | | 6/2003 | Mauldin | |
| 6,601,057 B1 | * | 7/2003 | Underwood et al. | 707/1 |
| 6,647,383 B1 | * | 11/2003 | August et al. | 707/3 |
| 6,697,825 B1 | * | 2/2004 | Underwood et al. | 715/207 |
| 7,254,581 B2 | * | 8/2007 | Johnson et al. | 707/100 |
| 2002/0040311 A1 | * | 4/2002 | Douglass et al. | 705/7 |
| 2002/0082953 A1 | | 6/2002 | Batham et al. | |
| 2002/0129062 A1 | * | 9/2002 | Luparello | 707/513 |
| 2004/0001104 A1 | * | 1/2004 | Sommerer et al. | 345/811 |
| 2004/0041818 A1 | | 3/2004 | White et al. | |
| 2004/0085338 A1 | | 5/2004 | Terashima et al. | |
| 2005/0114163 A1 | * | 5/2005 | Wesinger et al. | 705/1 |

FOREIGN PATENT DOCUMENTS

EP          1298541          2/2003

* cited by examiner

*Primary Examiner*—Doug Hutton
*Assistant Examiner*—Chau Nguyen
(74) *Attorney, Agent, or Firm*—Janis E. Clements

(57) ABSTRACT

A system, method, and related computer program for automatically cataloging Web elements, such as text and color, in a Web document for use by those performing searches for Web documents containing specific Web elements. The present invention allows users to scan Web elements into a Web site database where they are automatically cataloged for future searches of the particular element data. Searchers can search for a source document containing a particular color and/or text. Users may enter values related to scanned-in Web elements on source documents, such as an alternate color that may be used in addition to or instead of the scanned in color on said source document. Web elements or graphics are cataloged in a manner that allows users to query an entire set of objects quickly by accessing the database values. A user is able to automatically change text or color values on a global basis. Alternate values entered into the Web site database override Web element data previously scanned into the database.

8 Claims, 5 Drawing Sheets

METHOD FOR AUTOMATICALLY CATALOGING WEB ELEMENT DATA

TECHNICAL FIELD

The present invention relates to computer managed communication networks such as the World Wide Web (Web) and, particularly, to systems, processes, and programs for utilizing scanning technology, such as optical character recognition (OCR), to scan a Web page, read text and colors used in graphics, and automatically catalog said Web elements in a database for future reference by a user. The cataloged information is used in searches for Web documents having specific Web elements, such as text and color.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet (or Web) related distribution of documents, media, and programs. The convergence of the electronic entertainment and consumer industries with data processing exponentially accelerated the demand for wide ranging communication distribution channels, and the Internet (or Web), which had quietly existed for over a generation as a loose academic and government data distribution facility, reached "critical mass" and commenced a period of phenomenal expansion. With this expansion, businesses and consumers have direct access to all matter of documents, media, and computer programs.

Also, as a result of the rapid expansion of the Web, e-mail, multimedia files and documents, and real-time digital broadcastings (which have been distributed for over 25 years over smaller private and specific purpose networks) have moved into distribution over the Web because of the vastly improved server technology and channels that are available. The availability of extensive e-mail distribution channels has made it possible to keep all necessary parties in business, government, and public organizations completely informed of all transactions that they need to know about at almost nominal costs.

However, in the era of the Web, we do not have the situation of a relatively small group of professional designers working out the human factors; rather, anyone and everyone can design a Web document or e-mail document structure. As a result, Web and e-mail documents are frequently set up and designed in an eclectic manner. This often results in difficulty searching for Web documents containing specific Web elements, such as text and color. With the present invention, the user is able to scan in information regarding Web elements of a graphic. Subsequent users can search for a Web document containing specific Web elements, such as color and text combination in a graphic.

In one example, a user wants to search for Web documents with Web elements, such as an orange star with the text "Lonestar Roofing" before it uses such elements in its logo for advertising purposes. The user may also want to use the orange star without any text or words in some of its advertising materials. With the present invention, the user is able to search for all documents containing an orange star with the text "Lonestar Roofing" and also broaden the search by searching for all documents containing an orange star without text. In this example, assuming that the user finds no other Web documents with an orange star, the user begins using the orange star on Web documents as his company's logo and plans to use the same star shape in purple on some occasions. When the user scans in data regarding his logo Web elements into the database, the user can manually enter the alternate values related to the graphics, (i.e., that the star is purple), so that searches for a Web document containing a purple star will lead searchers to the user's documents containing both the orange star and the purple star.

SUMMARY OF THE PRESENT INVENTION

The present invention provides a solution to the previously recited problems by a system, method, and related computer program for automatically cataloging Web elements, such as text and color, in Web documents (e.g., e-mail, PDF files, source code files, presentation, spread sheet, video formats, and Word documents). The invention is operable in a communication network environment with user access via a plurality of data processor controlled interactive receiving display stations for displaying received documents of at least one display page (e.g., World Wide Web documents and e-mail containing formatted text and image data) and available from sources on the network. The system comprises interactive browser means associated with each of the said receiving stations for accessing received documents from the network and displaying the documents at any receiving display station. This network browser includes means that enable a user to scan in Web elements of Web documents, and to enter in alternate information regarding such Web elements for use in Web document searches for specific Web elements.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
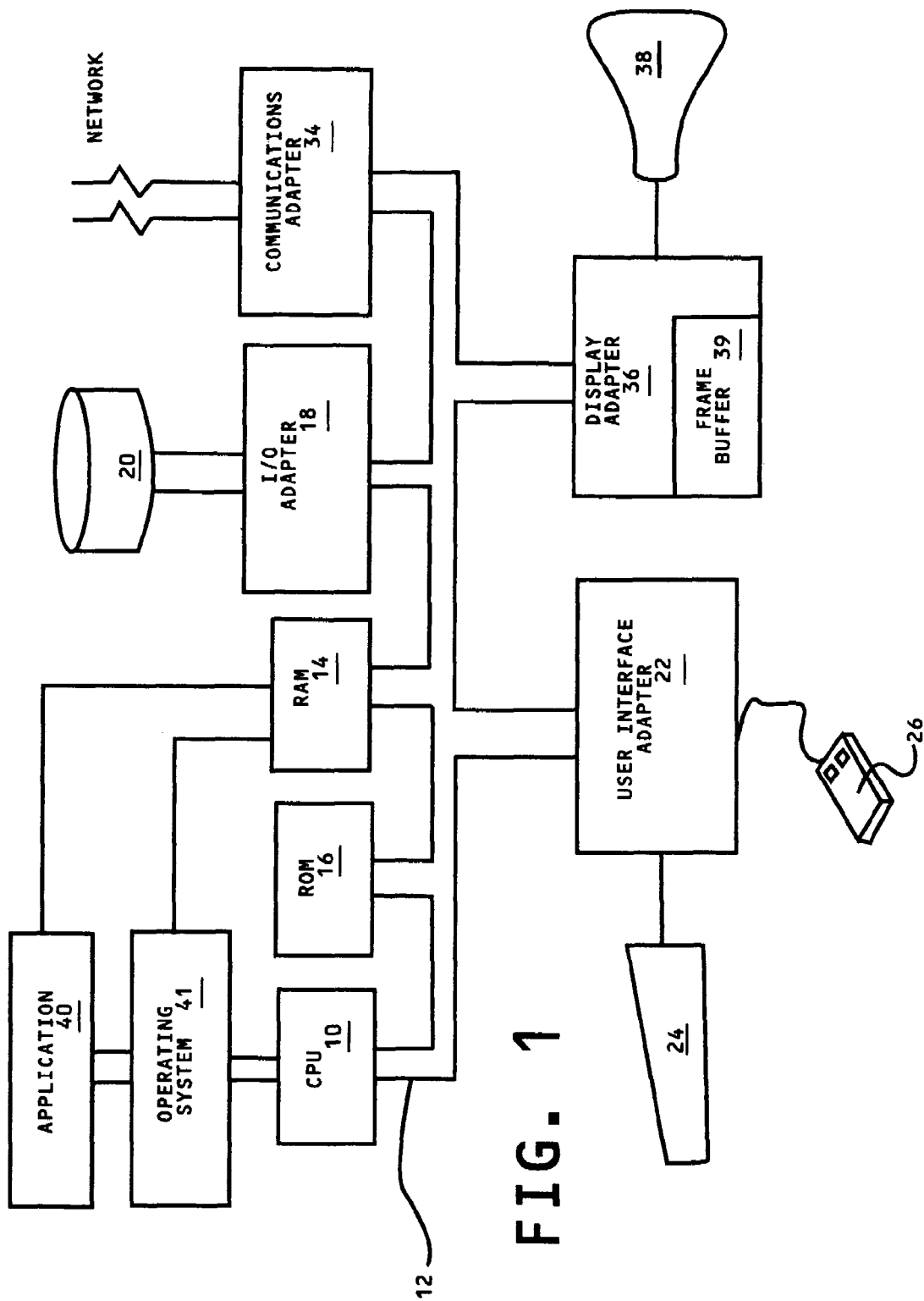
FIG. 1 is a block diagram of a data processing system including a central processing unit and network connections via a communications adapter which is capable of functioning as user interactive Web station for receiving and transmitting Web documents.

Referring to FIG. 1, a typical data processing terminal is shown that may function as the Web display station used for receiving Web pages and e-mail, browsing and requesting Web documents from sources on the Web, or for displaying other received documents, such as PDF files, source code files, presentation, spread sheet, video formats, and Word documents. "Received documents" is described herein to mean Web pages, e-mail, browsing, and other Web documents from sources on the Web, as well as other documents received by some other source, like a computer disc, such as PDF files, source code files, presentation, spread sheet, video formats, and Word documents.

A central processing unit (CPU) 10 may be one of the commercial microprocessors in personal computers available from International Business Machines Corporation (IBM) or Intel Corporation; when the system shown is used as a server computer at the Web distribution site, to be subsequently described, then a workstation is preferably used (e.g., RISC System/6000™ (RS/6000) series available from IBM). The CPU 10 is interconnected to various other components by system bus 12. An operating system 41 runs on a CPU 10, provides control, and is used to coordinate the functions of the various components of FIG. 1. Operating system 41 may be one of the commercially available operating systems such as IBM's AIX 5L™ operating system; Microsoft's Windows XP™; or Windows2000™, as well as other UNIX and AIX operating systems. Application programs 40, controlled by the system, are moved into and out of the main memory Random Access Memory (RAM) 14. These programs include the programs of the present invention for automatically cataloging Web elements of a Web document, such as text and color. The programs will be subsequently described in combination with any conventional Web browser, such as the Mozilla Firefox 1.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with the outside network enabling the data processing system to communicate with other such system over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Because a major aspect of the present invention is directed to documents, such as Web pages transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks, as well as other documents, like PDF files, source code files, presentation, spread sheet, and Word documents that may or may not have been accessed from the Web or other networks, and is intended to include Web pages with displayable Web elements, such as text, color, graphics and other images.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. The images on the Web pages are implemented in a variety of image or graphic files such as MPEG, JPEG or GIF files, which are described in the text, *Internet: The Complete References, Millennium Edition*, Young et al., 1999, Osborne/McGraw-Hill, particularly at pp. 728-730.

In addition, aspects of this invention will involve Web browsers. A general and comprehensive description of browsers may be found in the above-mentioned *Mastering the Internet* text at pp. 291-313. More detailed browser descriptions may be found in the above-mentioned *Internet: The Complete Reference, Millennium Edition* text: Chapter 19, pp. 419-454, on the Netscape Navigator; Chapter 20, pp. 455-494, on the Microsoft Internet Explorer; and Chapter 21, pp. 495-512, covering Lynx, Opera and other browsers. The invention may involve the use of search engines for searching. As described in the above-mentioned *Internet: The Complete Reference, Millennium Edition* text, pages 395 and 522-535, search engines use key words and phrases to query the Web for desired subject matter.

Figure 2:
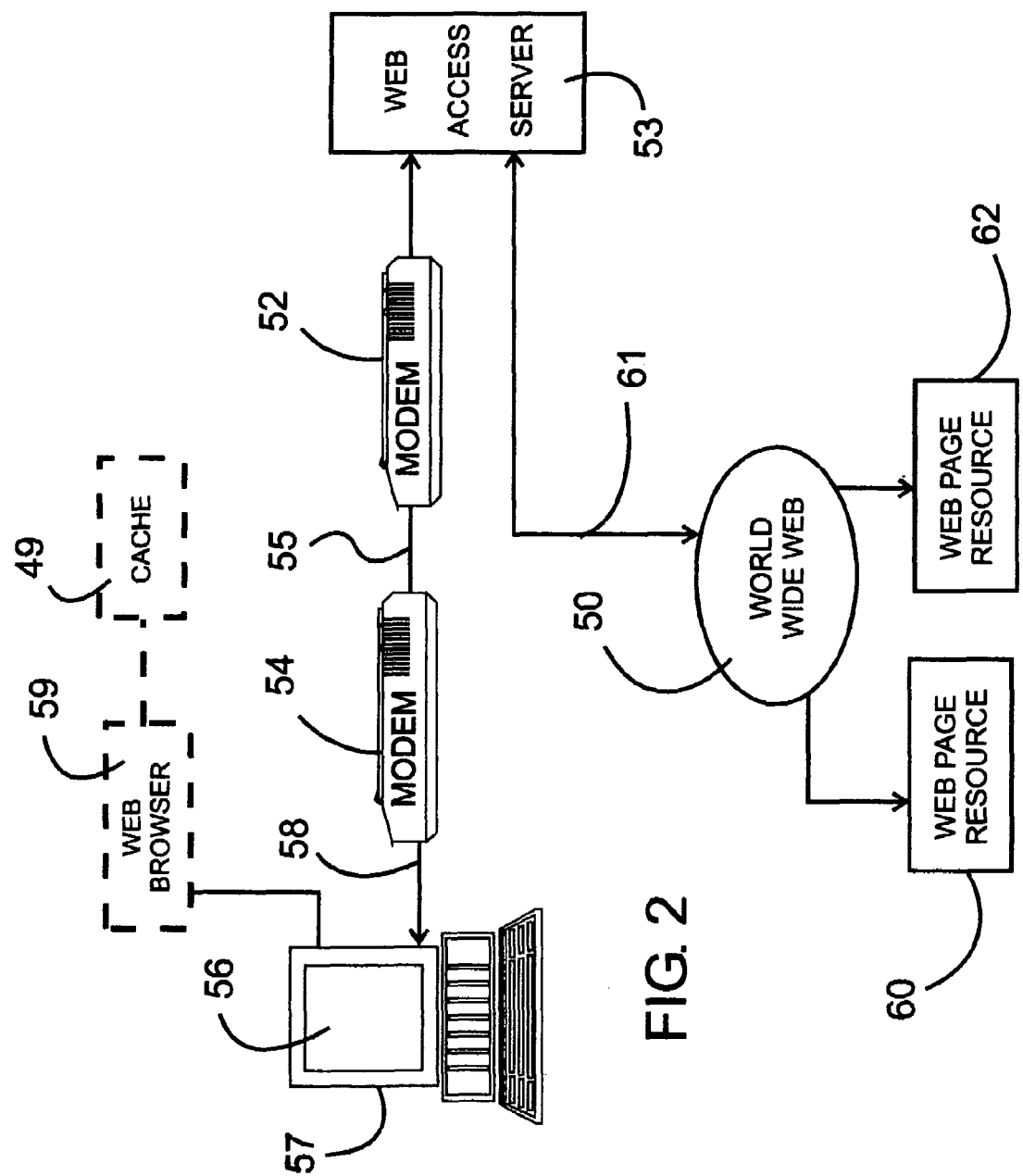
FIG. 2 is a generalized diagrammatic view of a Web portion upon which the present invention may be implemented.

While the present invention may effectively be used in a private network environment, for convenience in illustration, a generalized portion of the Web as shown in FIG. 2 will be used. A generalized diagram of a portion of the Web, which the computer controlled display terminal 57 used for Web page receiving and browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and is functioning running programs in a desktop or workspace environment on display 56. What is displayed may be electronic documents in the form of e-mail or other Web documents or pages, or other documents, such as PDF files, source code files, presentation, spread sheet, and Word documents.

Reference may be made to the above-mentioned *Mastering the Internet*, pp. 136-147, for typical connections between local display workstations to the Internet via network servers, any of which may be used to implement the system on which this invention is used. The system embodiment of FIG. 2 is one of these known as a host-dial connection. Such host-dial connections have been in use for over 30 years through network access servers 53 which are linked 61 to the Internet 50. High speed cable modems are now replacing the telephone lines. The servers 53 are maintained by a service provider to the client's display terminal 57. The host's server 53 is accessed by the client terminal 57 through a normal dial-up telephone or high speed cable linkage 58 via modem 54, telephone line 55, and modem 52. The files representative of the Web pages, e-mail, or messages are downloaded to display terminal 57 through controlling server 53 via the telephone or cable line linkages from server 53, which has accessed them from the Internet 50 via linkage 61.

Web browser 59 controls the Web page/e-mail accessing and messaging display functions being described, including communications to and from sources 60 and 62 via Web 50. Browser 59 has an associated cache for temporary storage of documents and e-mail obtained from the network through the browser. Web server 53 will carry out the functions of obtaining the Web documents, pages, or sections of the documents as requested by the user via Web browser 59 and downloaded into storage in Web cache 49. With this setup, the present invention, which will be described in greater detail with respect to FIG. 3, may be carried out using Web browser 59 and associated Web server 53 (FIG. 2).

Figure 3:
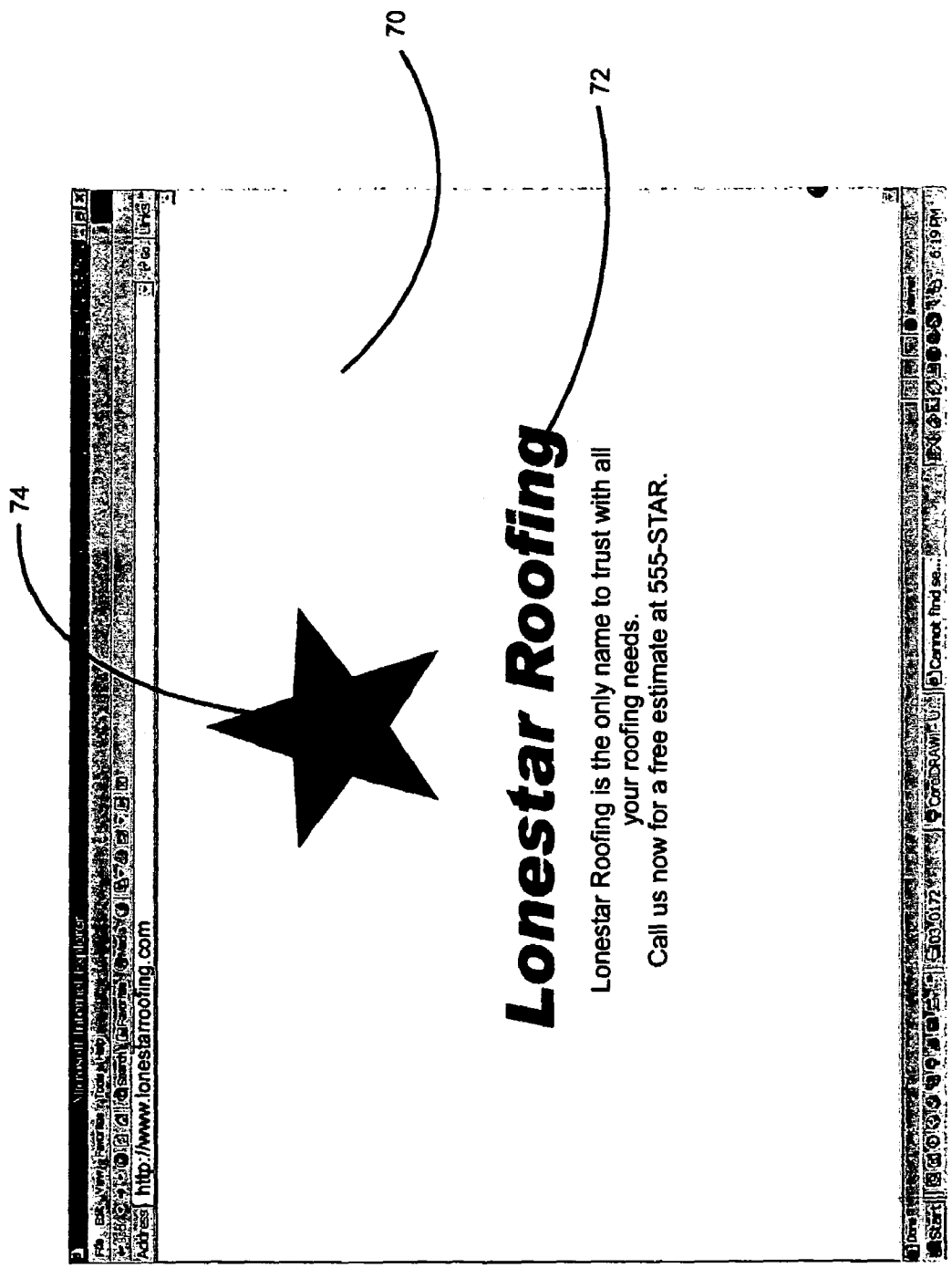
FIG. 3 is a diagrammatic view of a typical network document page displayed at a receiving display station.

Now, with respect to FIG. 3, we will give an illustrative example of how the present invention may be used to provide an implementation for automatically cataloging Web elements of Web documents, such as a Web page, PDF file, source code file, presentation, spread sheet, video format, or Word document. The present invention allows a user to catalog graphics in a manner that allows users to query an entire set of objects quickly by accessing the database of values and not having to search real-time, unless the user chooses to do so. For purposes of this illustrative embodiment, assume that a document 70 containing Web elements, such as a logo with text 72 and color 74, is displayed at a display station or interface. The document 70 is an advertisement and the user scanned in the Web elements of the document 70, including text 72 and color 74 on the logo. The user also entered alternate values (e.g., that the orange star can also be purple). The user can specify shade ranges to identify the scope of the purple match. The alternate values override the scanned data about the Web elements. The Web elements scanned in by the user and the alternate values entered in by the user are useable for Web document searches.

Note that the invention can catalog the graphic files and the like with background process to allow the user to query an entire set of objects quickly by accessing the database of values and not having to search the object real-time, unless the user chooses this explicit action.

Figure 4:
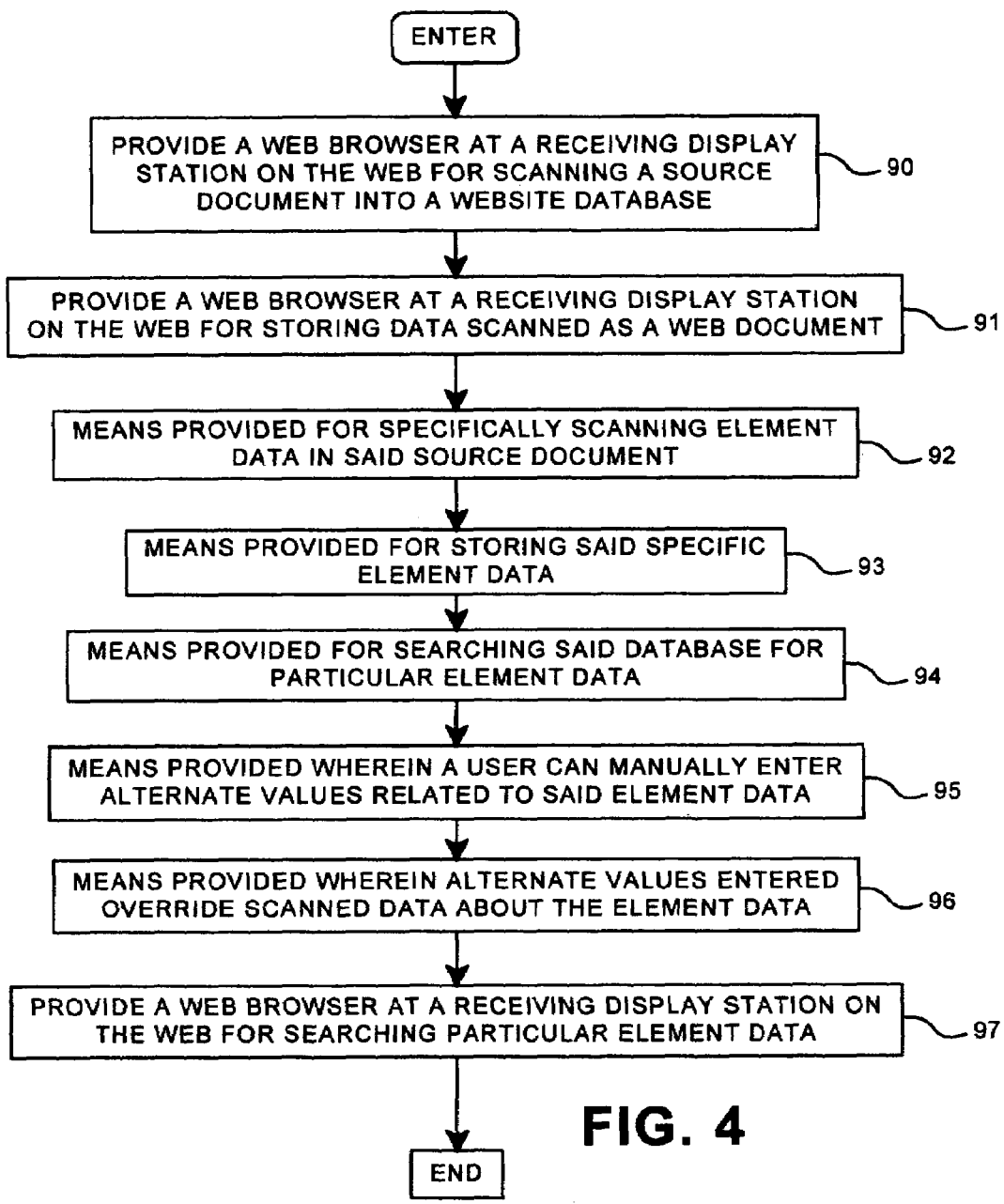
FIG. 4 is an illustrative flowchart describing the setting up of the process of the present invention for automatically cataloging Web elements of a Web document.

FIG. 4 is a flowchart showing the development of a process according to the present invention for automatically cataloging Web elements of Web documents. Most of the programming functions in the process of FIG. 4 have already been described in general with respect to FIG. 3. A Web browser is provided at a receiving display station on the Web for scanning a source document into a Web site database, step 90, and storing data scanned on said source document as a Web document, step 91. Means provided for specifically scanning element data in said source document, step 92, and storing said specific element data, step 93. Means provided for searching said database for particular element data, step 94. Said element data includes text and color, and said source documents can be Web documents, e-mails, PDF files, source code files, presentations, spread sheets, video formats, or Word documents. Means provided wherein a user can manually enter alternate values related to said element data, step 95. Provide means for alternate values entered in to override scanned data about the element data, step 96. Provide a Web browser at a receiving display station for searching for Web documents containing particular element data, step 97.

Figure 5:
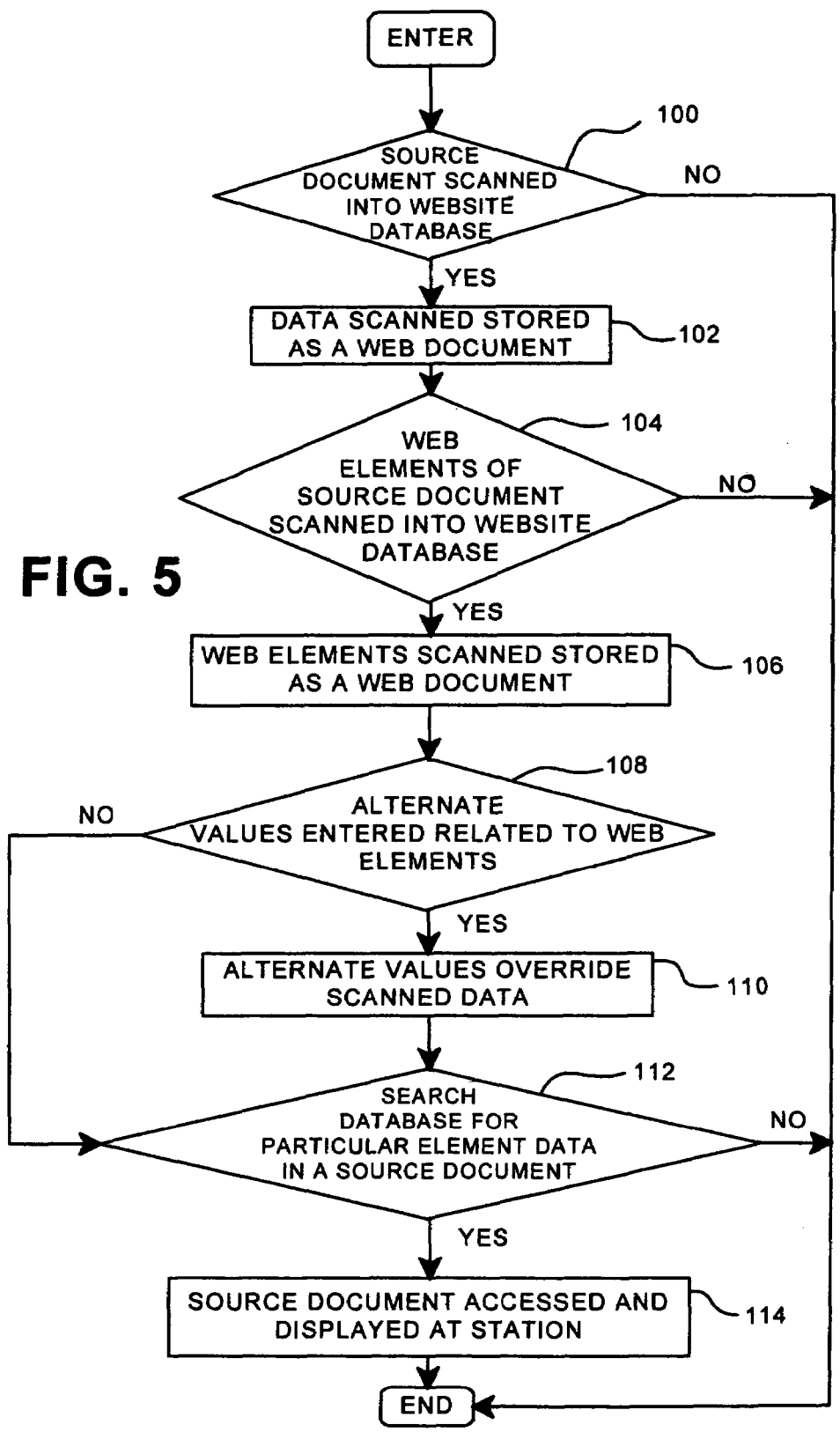
FIG. 5 is a flowchart of an illustrative run of the process set up in FIG. 4.

The running of the process set up in FIG. 4 and described in connection with FIGS. 3 and 4 will now be described with respect to the flowchart of FIG. 5. The flowchart represents some steps in a routine that will illustrate the operation of this invention. A determination is made by a user whether to scan a source document into a Web site database, step 100. If No, the process ends. If Yes, data scanned is stored as a Web document, step 102. A determination is made regarding whether to scan Web elements of a source document into the Web site database when said document is scanned, step 104. Web elements include text, color, and other such graphic characteristics. If No, the process ends. If Yes, Web elements scanned are stored as a Web document, step 106. A determination is made regarding whether to enter alternate values into the Web site database regarding the Web elements, step 108. If Yes, the alternate values will override scanned element data, step 110. If No, a determination is made whether to search the database for particular element data in a source document, step 112. If No, the process ends. If Yes, a user is able to access source documents in response to a search for particular Web elements and display said source documents at station, step 114.

One of the preferred implementations of the present invention is in application program 40 made up of programming steps or instructions resident in RAM 14, FIG. 1, of Web server computers during various Web operations. Until required by the computer system, the program instructions may be stored in another readable medium (e.g., in disk drive 20), or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

With the cataloging of graphic files and the like, the user can then make global modifications to change all orange to purple, for example, based on graphics that matched earlier search criteria or on all graphics in the database. The same is true with text. All instances of "sale" could be removed and replaced with a background color in the case of graphics, or changed to "regular price" in the case of text. The invention performs this action by modifying each object in the set of objects to change and replacing the object in the deployed location. Modification can be done through standard graphic and text replacement techniques. The user can review the changes before they are externalized or have the changes deployed automatically.

Although certain preferred embodiments have been shown and described, it will be understood that many changes and modifications may be made therein without departing from the scope and intent of the appended claims.

What is claimed is:

1. A system for automatically cataloging elements of a website, comprising:

means for scanning a source document within said Web site, wherein source document comprises a webpage of said web site and said means for scanning comprises:

means for performing an optical character recognition operation on an image embedded within said source document to produce recognized text element data;

means for performing a specific scan operation on said image embedded within said source document to determine image color element data for said image embedded within said source document;

means for receiving a manual user modification of at least one of said recognized text element data and said image color element data to produce modified element data;

means for associating said modified element data with said source document;

means for receiving a search string comprising one or more search terms; and means for identifying said source document from a plurality of source documents utilizing said one or more search terms, wherein said means for identifying said source document comprises means for comparing said one or more search terms with said modified element data.

2. The system of claim 1 wherein said source documents are Web documents.

3. The system of claim 1 wherein said documents are e-mail documents.

4. A method for automatically cataloging elements of a Web site comprising:

scanning a source document within said Web site, wherein source document comprises a webpage of said web site and said scanning comprises:

performing an optical character recognition operation on an image embedded within said source document to produce recognized text element data;

performing a specific scan operation on said image embedded within said source document to determine image color element data for said image embedded within said source document;

receiving a manual user modification of at least one of said recognized text element data and said image color element data to produce modified element data;

associating said modified element data with said source document;

receiving a search string comprising one or more search terms; and identifying said source document from a plurality of source documents utilizing said one or more search terms, wherein said identifying said source document comprises comparing said one or more search terms with said modified element data.

5. The method of claim 4 wherein said source documents are Web documents.

6. The method of claim 4 wherein said documents are e-mail documents.

7. A network browser computer program having code recorded on a computer readable medium associated with each of said receiving stations for eliminating extraneous displayable data from received documents in a communication network with user access via a plurality of data processor controlled interactive receiving display stations for automatically cataloging elements of a Web site comprising:

means for scanning a source document within said Web site, wherein source document comprises a webpage of said web site and said means for scanning comprises:

means for performing an optical character recognition operation on an image embedded within said source document to produce recognized text element data;

means for performing a specific scan operation on said image embedded within said source document to determine image color element data for said image embedded within said source document;

means for receiving a manual user modification of at least one of said recognized text element data and said image color element data to produce modified element data;

means for associating said modified element data with said source document;

means for receiving a search string comprising one or more search terms; and means for identifying said source document from a plurality of source documents utilizing said one or more search terms, wherein said means for identifying said source document comprises means for comparing said one or more search terms with said modified element data.

8. The computer program of claim 7 wherein said documents are e-mail documents.

* * * * *